Aug. 11, 1959     C. T. FREDRICKSON     2,898,624

HOG POLISHER

Filed Jan. 17, 1956

INVENTOR.
CARL THEODORE FREDRICKSON
BY R. G. Story
ATTORNEY

United States Patent Office 2,898,624
Patented Aug. 11, 1959

2,898,624

HOG POLISHER

Carl Theodore Fredrickson, Sioux City, Iowa, assignor to Swift & Company, Chicago, Ill., a corporation of Illinois Application January 17, 1956, Serial No. 559,590

3 Claims. (Cl. 17—17)

This invention relates to a method and apparatus for cleaning animal carcasses, and more particularly to an improved device for the substantially complete removal of hair and dirt from those portions of carcasses difficult to clean.

In the processing of animal carcasses, particularly hogs, it is important that all of the hair, dirt and foreign materials be removed from the surface of the skin before proceeding with normal butchering operations. It is imperative, both from the standpoint of cleanliness and palatability of the final product, that all hair be removed from the animal. In the case of certain items, such as pigs feet produced from hog carcasses, the skin of the animal remains on the product as it reaches the consumer, and even the smallest hairs make the pigs feet unattractive.

In conventional meat processing operations the hind feet of a hog are shackled and the animal is suspended in an inverted position on a trolley conveyor prior to slaughtering. After bleeding, the hog carcass is immersed in a scalding tank to loosen the hair for easy removal and then conveyed to a dehairing machine. The dehairing machine consists of a series of mechanical beaters or scrapers which remove the hair from a large portion of the carcass. The dehairing machine does not remove the small light colored hair on the body surface, however, and it becomes necessary to singe the carcass with a torch and then "polish" with a rotating flexible brush to further clean the carcass. Finally, skilled workmen shave the more inaccessible parts of the carcass to remove residual hair. Mechanical polishing machines have been used heretofore to remove the last traces of hair remaining on a carcass after the dehairing operation. Although these machines remove the greater portion of the hair on parts of the carcass which are easily accessible, such as the back and sides of the body, the area around the hind legs of the animal is not well cleaned. It is therefore necessary to resort to hand labor to clean the hind feet of the carcass. Skilled workmen are required to perform this hand-shaving step since a certain amount of dexterity is required in shaving the hogs in order to insure complete cleaning without cutting the skin.

It is, therefore, an object of this invention to provide a device which will mechanically clean the entire surface of a carcass and reduce the necessity for shaving by hand. One factor in achieving this is the rotation that the machine inherently imparts to the carcass.

An advantage in the practice of the present invention resides in the fact that the final cleaning step, which has heretofore been a hand operation, is carried out mechanically during the polishing stage, resulting in a substantial monetary saving.

Another object of this invention is the provision of a method for mechanically removing hair from the more inaccessible portions of a carcass.

Additional objects, if not specifically pointed out herein, will be apparent to one skilled in the art from the following detailed description of the invention.

Figures 1, 2:
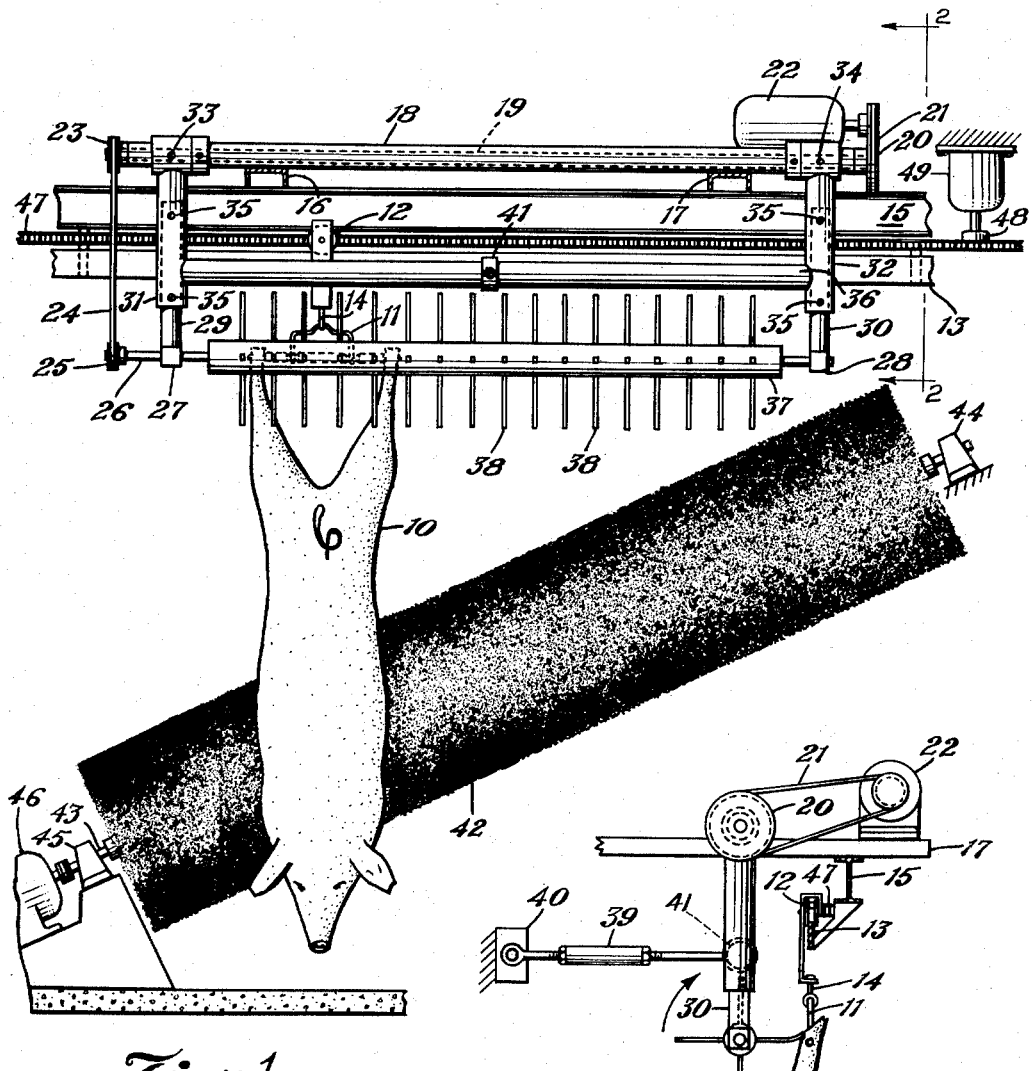
Figure 1 is a side elevational view of the machine showing a suspended hog carcass in position to be passed therethrough.
Figure 2 is a partial end view taken along line 2—2 of Figure 1 showing the hind feet cleaning part of the device.

In accordance with the novel method of this invention, a carcass is suspended from the hind feet in such a manner that it may be easily rotated about the vertical axis thereof. An angular force is exerted against the body of the carcass to rotate it. The rotation insures that the entire circumference of the hind feet will be exposed to a fixed frictional rubbing force which is applied in the area of the hind feet. The combination of the angular force of rotation with the vertical rubbing force applied to the hind feet area of the carcass provides a very economical and efficient method for cleaning those parts of the carcass most difficult to clean. In addition, cleaning of the bulk of the carcass is easily achieved by imparting lateral movement thereto since the means by which the angular force is exerted also serves as a cleaning element. The carcass polishing method of this invention provides a substantial advance over previous carcass cleaning operations in that carcasses treated as shown herein may be more completely cleaned in a shorter time and at less expense than has been heretofore possible.

Referring to Figure 1, a hog carcass 10 is shown suspended by means of a shackle 11 from trolley 12 which rides on rail 13. Shackle 11 is attached to the trolley 12 by means of a swivel bolt 14 which permits rotation of the carcass as it passes through the device. Trolley rail 13 depends from a channel bar 15 running along the path of the processing line. Mounted upon the channel bar and extending transversely thereof are a pair of supports 16 and 17 which support a tubular member 18. Journaled within the tubular member and extending therethrough is a drive shaft 19. The driving end of said shaft is attached to a drive pulley 20 which is connected by means of a belt 21 to a motor 22. The other end of the shaft 19 is equipped with a pulley 23 which is operatively connected by a belt 24 to pulley 25 on shaft 26. Shaft 26 is mounted by means of bearings 27 and 28 in upright frame members 29 and 30. The upright members are telescoped in tubular elements 31 and 32 which are in turn attached to collar members 33 and 34 supported on shaft 19. Vertical adjustment of shaft 26 is provided by means of set screws 35 extending into frame members 31 and 32 engaging the uprights 29 and 30. A cross bar 36 is secured to the upright members 29 and 30, reinforcing them in spaced relationship.

The hind feet cleaning means comprises a tubular drum 37 secured to shaft 26 and carrying a series of cleaning members 38. The cleaning members 38 extend radially from the surface of the drum at regular intervals. Cleaning members 38 are sufficiently rigid to offer a certain resistance to the body of the carcass on which they impinge and yet have enough resiliency to avoid tearing of the skin. Movement of these cleaning fingers provides an impact together with a scraping or abrasive force sufficient to remove hair from the carcass while avoiding breaking of the surface of the skin.

As best seen in Figure 2, horizontal adjustment of the hind feet cleaning portion of the machine is provided by turnbuckle 39 which is anchored to a wall or other upright support as at 40 and attached to cross bar 36 by means of a ring 41. Adjustment of the turnbuckle permits horizontal adjustment of the hind feet cleaning means to compensate for carcasses of different sizes by pivoting the tubular elements depending from collars 33 and 34 about shaft 19.

Positioned beneath the trolley rail 13 is a continuous brush or beater 42 mounted on a shaft 43. Shaft 43 is inclined between horizontal and vertical and is journalled in bearings 44 and 45. Rotation of the shaft is provided by motor 46. As the carcass advances through the machine propelled by a pulling force on cable 47 by a sprocket 48 on a gear motor 49, the entire body portion is progressively contacted by the brush 42 because of the inclined position of the brush.

In operation, the hind feet of a hog carcass are shackled on the swiveled shackle 11 and the carcass is advanced through the machine and into contact with the inclined revolving beater 42. Because of the angle at which the carcass is contacted by the revolving brush, the carcass is caused to rotate on the swiveled shackle. The incline in the polishing brush insures a force on the carcass of both a vertical and horizontal component which causes rotation thereof. Rotation of the carcass permits cleaning members 38 to reach the entire circumference of each of the hind legs and also facilitates the removal of hair from areas on the hind legs which have heretofore required hand shaving.

Carcasses of various weights and sizes can be polished with this device because of the provision for both horizontal and vertical adjustment of the hind leg cleaning portion. It is also possible, as a result of the vertical adjustability provided by the telescoped vertical frame members 29 and 30, to adapt the machine to various types of conveyor rails and shackles.

The body polishing member is not limited to a continuous brush as shown since any of the equivalent beater devices well known in the art for polishing operations are satisfactory for this purpose.

The terms "polish" and "polishing" as used herein are intended to connote the fine hair removal and cleaning operation known to the art as distinguished from the vigorous beating action characteristic of scraping operations. The cleaning is achieved by frictional movement of one body against another as in chafing or burnishing.

It should be apparent that the device of this invention provides a continuous and automatic method for polishing hogs and other type carcasses, removing the necessity for much of the hand operations inherent in prior art methods.

Obviously, many modifications and varations of the invention hereinbefore set forth may be made without departing from the spirit and scope thereof, and therefore only such limitations should be imposed as are indicated in the appended claims.

I claim:
1. Apparatus for polishing a carcass comprising: carcass conveying means; rotatably mounted carcass suspending means depending from said conveying means; a first rotatable polishing means mounted adjacent and parallel to said conveying means; and a second rotatable polishing means mounted below said conveying means and in a vertical plane substantially parallel to the vertical plane of said conveying means, said second polishing means being inclined to the horizontal plane of said conveying means.

2. Apparatus for polishing a carcass comprising: a carcass conveying means; a rotatably mounted shackle depending from said conveying means, said shackle being adapted to suspend said carcass by the hind feet thereof; a first rotatable polishing means mounted adjacent and parallel to said conveying means, said first polishing means adapted to polish the hind feet of said carcass; and a second rotatable polishing means mounted below said conveying means and in a vertical plane substantially parallel to the vertical plane of said conveying means, said second polishing means being inclined to the horizontal plane of said conveying means, thereby polishing a major portion of said carcass and imparting a rotative movement thereto.

3. Apparatus for polishing a carcass suspended by the hind feet, said apparatus comprising: a conveyor; a rotatably mounted carcass shackle depending from said conveyor; a tubular drum rotatably mounted adjacent and parallel to said conveyor; hind feet cleaning members fixedly attached to said tubular drum; and a continuous beater mounted below said conveyor and in a vertical plane substantially parallel to the vertical plane of said conveyor, said continuous beater being inclined to the horizontal plane of said conveyor, thereby contacting a major portion of said carcass and imparting a rotative movement thereto.

References Cited in the file of this patent

UNITED STATES PATENTS

| | | |
|---|---|---|
| 663,449 | Lebiedzinski | Dec. 11, 1900 |
| 685,283 | Kohlhepp | Oct. 29, 1901 |
| 882,719 | Smith | Mar. 24, 1908 |
| 1,834,479 | Taylor | Dec. 1, 1931 |
| 2,084,857 | McKee et al. | June 22, 1937 |
| 2,100,299 | Tobin | Nov. 23, 1937 |
| 2,469,345 | Toti et al. | May 3, 1949 |
| 2,782,457 | Lentz et al. | Feb. 26, 1957 |

FOREIGN PATENTS

| | | |
|---|---|---|
| 51,269 | Denmark | Feb. 17, 1936 |